US012706462B2

(12) United States Patent
Daly et al.

(10) Patent No.: US 12,706,462 B2
(45) Date of Patent: Aug. 11, 2026

(54) CHARACTERIZING ELECTRICAL GRID AND PREDICTING FAULT CONDITIONS USING INVERTERS

(71) Applicant: X Development LLC, Mountain View, CA (US)

(72) Inventors: Raymond Daly, Palo Alto, CA (US); Leo Francis Casey, San Francisco, CA (US); Hamed Khalilinia, San Mateo, CA (US)

(73) Assignee: X Development LLC, Mountain View, CA (US)

( * ) Notice: Subject to any disclaimer, the term of this patent is extended or adjusted under 35 U.S.C. 154(b) by 516 days.

(21) Appl. No.: 18/339,757

(22) Filed: Jun. 22, 2023

(65) Prior Publication Data

US 2024/0429715 A1 Dec. 26, 2024

(51) Int. Cl.
*H02J 3/38* (2026.01)
*H02J 103/30* (2026.01)

(52) U.S. Cl.
CPC .......... *H02J 3/381* (2013.01); *H02J 2103/30* (2026.01)

(58) Field of Classification Search
CPC .......... H02J 3/381; H02J 2203/20; H02J 3/38; H02J 3/0012; G01R 31/52
See application file for complete search history.

(56) References Cited

U.S. PATENT DOCUMENTS 11,362,539 B1 6/2022 Alam et al.
2016/0098768 A1* 4/2016 Price .................... G06Q 50/06 705/412
2023/0062817 A1 3/2023 Manson
2023/0194580 A1* 6/2023 Penttonen .......... G01R 19/2513 702/60
2024/0178667 A1* 5/2024 Pankova ........... H02J 13/00002
2024/0322555 A1* 9/2024 Sun ........................ H02H 7/268
2024/0332965 A1* 10/2024 Wells .................. G01R 31/086

FOREIGN PATENT DOCUMENTS

WO WO 2023/032554 3/2024

OTHER PUBLICATIONS

Invitation to Pay Additional Fees in International Appln. No. PCT/US2024/035050, Nov. 6, 2024, 10 pages.
International Search Report and Written Opinion in International Appln. No. PCT/US2024/035050, mailed on Jan. 28, 2025, 17 pages.
International Preliminary Report on Patentability in International Appln. No. PCT/US2024/035050, mailed on Jan. 2, 2026, 10 pages.

* cited by examiner

*Primary Examiner* — Charles Cai
(74) *Attorney, Agent, or Firm* — Fish & Richardson P.C.

(57) ABSTRACT

An inverter coupled to an electrical power grid characterizes the electrical power grid. The inverter outputs a plurality of electrical signals of different frequencies to the electrical power grid, measures responses of the electrical power grid to the plurality of electrical signals to obtain measurement data, and processes the measurement data to generate prediction data that characterizes one or more fault conditions of the electrical power grid. The inverter adjusts an operational setting of the inverter based on the prediction data. The operational setting affects a response of the electrical power grid to a fault condition.

15 Claims, 5 Drawing Sheets

CHARACTERIZING ELECTRICAL GRID AND PREDICTING FAULT CONDITIONS USING INVERTERS

TECHNICAL FIELD

This specification generally relates to characterizing an electrical power grid using electrical inverters.

BACKGROUND

An electrical inverter is a device that is used to convert direct current (DC) electricity to alternating current (AC) electricity. Inverters are commonly used in a variety of applications, including solar power systems, backup power systems, and electrical-powered vehicles. In a solar power system, for example, solar panels produce DC electricity, which is converted by a converter into AC electricity for use or storage. Similarly, backup power systems and vehicles with onboard electrical systems also often use inverters to convert DC power from batteries into AC power for use in appliances and other devices.

An electrical power grid is a network of power stations, substations, transformers, transmission lines, and other electrical assets that are used to deliver electrical power from generating facilities to the users. A fault in an electrical power grid refers to a problem or disruption in the flow of electrical power caused by a failure or malfunction in any of the components of the grid.

SUMMARY

This specification describes techniques for characterizing an electrical power grid. The characterization can be used, for example, to predict conditions that can potentially cause power grid failures. The characterization is achieved by using measurement data obtained from one or more electrical inverters that are integrated into the electrical power grid.

Power grid faults can cause significant damage and disruptions to the system, and it is critical to quickly detect, locate, diagnose, and remediate the faults. Further, it would be desirable to be able to predict faults that are likely to occur in a power grid within a time frame (e.g., based on changes in voltage, current, and frequency at different locations in the power grid, as well as environmental factors), so protection and prevention strategies can be applied in time.

However, diagnosing and predicting power grid faults can be a complex and challenging task. Modern electric power grids are highly complex systems with many interconnected components, including power lines, transformers, generators, and switchgear. Faults can occur at any point in the system, making it difficult to pinpoint the exact location of the fault. Diagnosing power grid faults may require collecting and analyzing a large amount of data, including diagnostic tests and measurement data at various locations, including hard-to-access locations, in the power grid. This makes it difficult to diagnose the faults quickly.

Inverters are fast-responding, solid-state devices, which can rapidly adapt their output current and voltage based on downstream demand. A modern electrical power grid can include a large number of electrical inverters. For example, each household solar system can have an inverter to convert the DC electrical power generated by the solar panel to AC electrical power. Other examples of electrical inverters that have already been incorporated into an electrical power grid include batteries and electric vehicles that are connected to the power grid. An inverter may also include a communication unit to communicate computer networks.

The techniques in this specification can utilize the electrical inverters that have already been ubiquitously incorporated into modern electrical power grids to characterize and predict fault conditions of the power grid. Further, the use of a machine-learning model can leverage available benchmark measurement data and simulation data to predict the grid fault conditions. As a result, the system can make accurate and timely predictions of the fault conditions, which makes it possible to re-configure or adjust the operating parameters of the power grid to avoid or mitigate the predicted fault conditions.

In one innovative aspect, this specification describes a method for power grid characterization. The method can be implemented by an electrical inverter electrically coupled to an electrical power grid. The inverter outputs a plurality of electrical signals of different frequencies to the electrical power grid, measures responses of the electrical power grid to the plurality of electrical signals to obtain measurement data, and processes the measurement data to generate prediction data that characterizes one or more fault conditions of the electrical power grid. Each of the characterized fault conditions in the fault conditions is associated with respective one or more grid conditions that potentially cause the fault condition. The inverter adjusts an operational setting of the inverter based on the prediction data. The operational setting affects a response of the electrical power grid to at least one grid condition associated with at least one fault condition in the characterized fault conditions.

In some implementations of the method, the measurement data includes one or more of the respective voltage measurements or respective current measurements.

In some implementations of the method, to adjust the operational setting, the inverter determines that the prediction data includes a potential overcurrent condition, and in response, adjusts the operational setting of the inverter to cause an adjustment to a phase angle of a current in the power grid proximate to the inverter.

In some implementations of the method, to adjust the operational setting, the inverter determines that the prediction data includes a malfunction of the inverter, and in response, adjusts the operational setting of the inverter to cause the inverter to electrically disconnect from the electrical power grid.

In some implementations of the method, to output the plurality of electrical signals, the inverter sequentially generates, for each respective frequency in the different frequencies, a respective voltage waveform having the respective frequency. For example, a frequency range of the different frequencies can include a range from 1 Hz to 10 KHz.

In some implementations of the method, to process the measurement data, the inverter generates, based on the measurement data, an impedance spectrum of the electrical power grid at the different frequencies, and processes the impedance spectrum by using a prediction model to generate the prediction data. For example, the impedance spectrum can include an amplitude spectrum and a phase angle spectrum. To process the impedance spectrum, the inverter processes one or more of the amplitude spectrum or the phase angle spectrum to generate the prediction data.

In some implementations of the method, to process the measurement data to generate the prediction data, the inverter processes an input including the measurement data by using a predictive model to generate the prediction data. For example, the input to the predictive model can include additional data characterizing one or more of: a current weather condition, a future weather condition, a time stamp, a maintenance record of the power grid, or an occurrence of a fire in an area of the electrical power grid.

In some implementations of the method, the prediction data includes, for each respective fault condition in the characterized fault conditions, one or more respective output values characterizing the occurrence of the respective fault condition. For example, one of the respective output values can characterize a likelihood of the respective fault condition currently occurring or a likelihood of the respective fault condition occurring within a predefined period of time.

In some implementations of the method, to process the measurement data to generate the prediction data, the inverter uses the measured data to identify the fault conditions from a set of predefined fault conditions. Each predefined fault condition is stored on the inverter as being associated with a respective predefined grid condition. A grid condition includes one or more of: a malfunction of the inverter, a failure of a component of the electrical power grid, or an abnormality at a load location. The failure of the component of the electrical power grid can include: a transformer failure, a circuit breaker failure, a failure of a capacitor, a fault in a transmission line, or a fault in a distribution line.

In some implementations of the method, one of the respective output values further characterizes a type of fault for the fault condition. The type of fault can include one or more of: a short circuit fault, an open circuit fault, a ground fault, an overload fault, a phase-to-phase fault, or a phase-to-ground fault.

In another innovative aspect, this specification describes an electrical inverter that when connected to an electrical power grid, is configured to perform the power grid characterization method described above.

In another innovative aspect, this specification describes one or more computer-readable storage media storing instructions that, when executed by one or more processors of an electrical converter, cause the one or more processors to control one or more circuits of the inverter to perform the power grid characterization method described above.

In another innovative aspect, this specification describes another power grid characterization method using measurement data collected from multiple electrical inventors. The method can be implemented by a computing system including one or more computers. The system receives, over a network, respective measurement data from each inverter of a plurality of inverters that are electrically coupled to an electrical power grid at a plurality of respective locations. The system processes the measurement data to generate prediction data that characterizes one or more fault conditions of the electrical power grid. In processing the measurement data, the system processes an input generated from the measurement data using a machine-learning model that has been trained based on training data including a plurality of training examples. Each training example of the plurality of training examples includes a respective training input characterizing respective voltage and/or current measurements and a respective training output characterizing at least one respective fault condition in the fault conditions. The system identifies, based on the prediction data, an adjustment to be performed in at least one grid component in the electrical power grid to reduce the chance of occurrence of at least one fault condition in the characterized fault conditions. The system sends, to the electrical power grid, instructions to adjust the operational settings of the electric power grid based on the identified adjustment.

In some implementations of the method, the respective measurement data received from each inverter includes one or more of respective voltage measurements or respective current measurements that the inverter measured over a plurality of frequencies.

In some implementations of the method, the adjustment includes at least one of replacing a piece of faulty equipment in the grid, disconnecting a particular inverter from the grid, or tuning set points of a controller in the grid.

In some implementations of the method, the plurality of training examples include one or more training examples generated from simulation data.

In some implementations of the method, the plurality of training examples include one or more training examples generated from measurement data.

In some implementations of the method, the input further includes data characterizing a grid topology of the electrical power grid.

In some implementations of the method, the input further includes data characterizing one or more of: a current weather condition, a future weather condition, a time stamp, a maintenance record of the power grid, or an occurrence of a fire in an area of the electrical power grid.

In some implementations of the method, the prediction data includes, for each respective fault condition in the characterized fault conditions, one or more respective output values characterizing the occurrence of the respective fault condition.

In some implementations of the method, one of the one or more respective output values characterizes a likelihood of the respective fault condition currently occurring or a likelihood of the respective fault condition occurring within a predefined period of time.

In some implementations of the method, the prediction data identifies the fault conditions from a set of predefined fault conditions. Each predefined fault condition is stored on the inverter as being associated with a respective predefined grid condition. A grid condition includes one or more of: a malfunction of the inverter, a failure of a component of the electrical power grid, or an abnormality at a load location. For example, the failure of the component of the electrical power grid can include: a transformer failure, a circuit breaker failure, a failure of a capacitor, a fault in a transmission line, or a fault in a distribution line.

In some implementations of the method, the respective output values include a value identifying or locating a component of failure.

In some implementations of the method, the instructions to adjust operational settings of the electric power grid include one or more of: an instruction to disconnect an inverter from the electrical power grid in response to determining a malfunction of the inverter, an instruction to disconnect a portion of the electrical power grid that is affected by the fault condition from other portions of the electrical power grid, an instruction to bypass a portion of the electrical power grid using an alternative route, or an instruction to re-boot one or more control nodes of the electrical power grid.

In another innovative aspect, this specification describes a system including one or more computers and one or more storage devices storing instructions that, when executed by the one or more computers, cause the one or more computers to perform the power grid characterization method described above. In another innovative aspect, this specification describes one or more computer storage media storing instructions that when executed by one or more computers, cause the one or more computers to perform the power grid characterization method described above.

The details of one or more embodiments of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
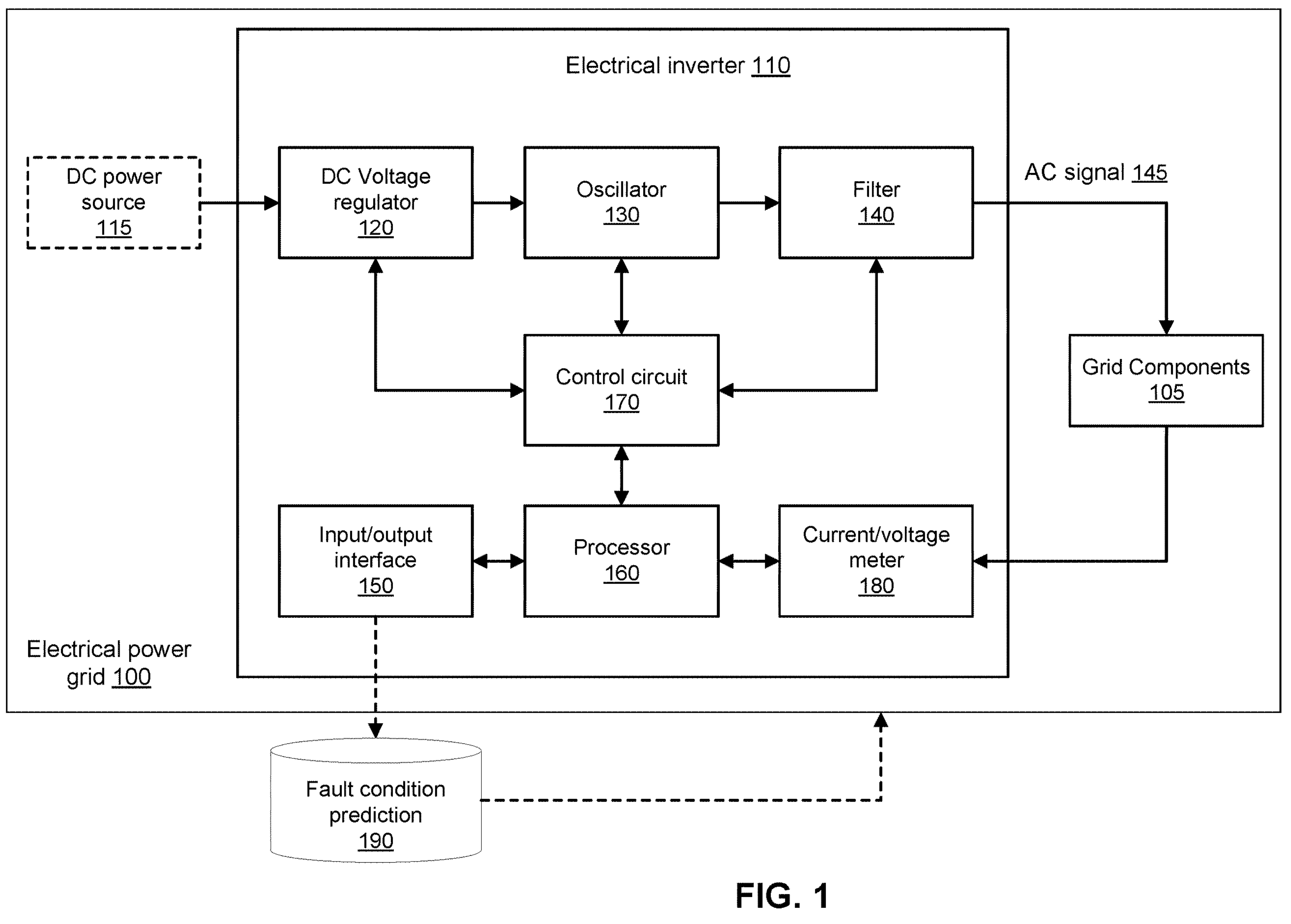
FIG. 1 shows an example of an electrical power grid that includes an electrical inverter configured to characterize the electrical power grid.

FIG. 1 shows an example of an electrical power grid 100 that includes an electrical inverter 110 configured to characterize the power grid 100. The electrical inverter 110 is electrically coupled to one or more other components 105 of the power grid 100.

In general, the inverter 110 is configured to convert DC electricity from a DC power source 115 to an AC output waveform. The conversion is performed by a set of electronic circuit units, including, e.g., a voltage regulator 120 configured to regulate an input DC voltage to a stable level, an oscillator 130 configured to generate an AC signal (e.g., a square wave or a pulse train waveform), a filter circuit 140 configured to remove unwanted harmonic and noise distortion and shaping the output waveform, and a control circuit 170 configured to control the frequency of output waveform and other operating parameters of the inverter 110. The inverter 110 further includes one or more processors 160, e.g., microprocessors, which are programmed to perform operations to characterize the power grid 100, such as detecting and predicting fault conditions in the power grid 100.

To characterize the power grid 100, the processor 160 is configured to control the circuit units of the inverter 110 to output an AC signal 145 to the power grid 100. The response of the power grid 100 to the AC signal 145 can be measured by measurement devices, e.g., the current (and/or voltage) meter 180 of the electrical inverter 110. The processor 160 processes the measurement data to generate prediction data that characterizes one or more fault conditions of the power grid.

The AC signal 145 can be in the form of an AC voltage signal or an AC current signal. In general, the AC signals 145 are low-magnitude signals (e.g., with a voltage or current magnitude below a threshold value) that do not interrupt normal operations of the power grid 100. In some implementations, the inverter 100 is controlled by the processor 160 to perform a frequency sweep when generating the AC signals 145. That is, the inverter 100 varies the frequency of the AC signal 145 at different time points, e.g., by changing the operating parameters of the oscillator 130 and/or the filter 140. In an illustrative example, the frequency range of the sweep can include a range from 1 Hz to 10 KHz.

The inverter 110 can use any appropriate frequency sweep scheme, e.g., a linear sweep, a logarithmic sweep, or a stepped sweep, to sweep through the frequency range with a specific number of swept frequencies. The frequency range, the number of sampled frequencies, and/or the frequency sweep scheme can be pre-defined or can be determined by the processor 160 according to factors such as the current state of the grid 100, the current time, historical measurement data of the grid, and/or historical prediction data of the grid.

For each of the swept frequencies, the response of the power grid 100 to the AC signal 145 is measured by one or more measurement devices (e.g., including the current meter 180). The measured response can include the amplitudes and/or phase angles of the voltage and/or current measured for each swept frequency. The measured response can further include, for one or more of the swept frequencies, voltage and/or current response at one or more harmonic frequencies.

The processor 160 receives the measurement data from the measurement devices, and processes the measurement data to generate prediction data 190 that characterizes one or more fault conditions of the power grid. For example, the prediction data 190 can include output values characterizing occurrences of the fault conditions, e.g., scores characterizing a likelihood of a fault condition (e.g., in a set of predefined fault conditions) currently occurring or occurring within a predefined period of time.

Faults can occur for a variety of reasons, including equipment failure, environmental events or factors, and human error. Examples of common types of faults in a power grid include a short circuit fault, an open circuit fault, a ground fault, an overload fault, a phase-to-phase fault, and a phase-to-ground fault.

One or more grid conditions can lead to one or more particular faults. For example, grid conditions such as equipment failures or undesired power line connections (e.g., resulted from lightning strikes or fallen tree limbs) can lead to a short circuit fault; grid conditions such as damages to the power lines or equipment failures can lead to an open circuit fault; grid conditions such as damaged insulation, faulty equipment, or unwanted ground connection can lead to a ground fault; grid conditions such as an increase in demand or faulty equipment can lead to an overload fault; grid conditions such as faulty equipment or improper installation can lead to a phase-to-phase fault; and grid conditions such as damaged insulation or faulty equipment can lead to a phase-to-ground fault.

The prediction data can include one or more fault conditions, and one or more grid conditions associated with the respective fault conditions. For example, the prediction data can include a malfunction of the inverter 110 itself, a failure of an asset component (e.g., a transformer failure, a circuit breaker failure, a capacitor failure, a fault in a transmission line, or a fault in a distribution line) of the power grid 100, or an abnormality at a load location of the power grid 100. The prediction data 190 can include data (e.g., a component index, a location coordinate, etc.) identifying the component of the failure as part of the grid condition. The prediction data 190 can specify the types of the fault conditions, such as a short circuit fault, an open circuit fault, a ground fault, an overload fault, a phase-to-phase fault, or a phase-to-ground fault.

In some implementations, the processor 160 can compute a spectrum of the characteristic impedance of the grid 100 at the connection port of the grid with the inverter 110 based on the voltage and current measured at the swept frequencies. The impedance spectrum can be a spectrum of complex numbers, that is, including both the amplitudes and phase angles of the impedance at the frequencies. The processor 160 can process the amplitude spectrum and/or the phase angle spectrum to generate the prediction data 190.

In some implementations, the processor 160 uses a predictive model to make the prediction data 190 based at least on the measurement data. That is, the processor 160 generates the prediction data 190 by processing a model input that includes the measurement data using the predictive model. In some implementations, the predictive model can be a machine-learning model, e.g., a linear regression model, a Bayes classifier, a support vector machine, a K-means clustering model, and/or a neural network. The parameters of the machine-learning model can be determined by a training process based on training data. The training data can include a set of training examples with each training example including a respective training input and a corresponding training label.

In some implementations, in addition to the measurement data for the response from the power grid 100, the processor 160 predicts the fault conditions based on other information that is potentially relevant to the conditions of the power grid 100, e.g., weather conditions (past, current, and/or forecast), a time stamp of the measurement data, maintenance record of the power grid 100, occurrences of events such as fire, flood, or earthquakes in an area of the power grid, and so on. The additional information can be a part of the input (in addition to the measurement data) to the predictive model.

After generating the prediction data 190, the processor 160 can take an action according to the prediction data 190. For example, in some implementations, the processor 160 can output the prediction data 190 via an input/output interface 150 to another system or to be presented to a user, e.g., to an operator of the power grid 100. For example, if the prediction data 190 predicts that a particular fault condition is likely to happen (e.g., when the likelihood score corresponding to the particular fault condition exceeds a threshold value), the inverter 110 can transmit (e.g., via a network) a report or an alert message including information of the fault condition to a device that can be accessed by an operator, so that timely measures can take place to prevent the fault condition from happening or to mitigate the effect of the fault condition.

In some implementations, the processor 160 can use the prediction data to identify an adjustment to an operational setting of the power grid 100. The adjustment is to reduce a chance of occurrence of at least one fault condition or to mitigate the negative effect of at least one fault condition predicted in the prediction data. The inverter 110 can perform an action based on the prediction data to affect a response of the electrical power grid to at least one grid condition associated with at least one fault condition in the characterized fault conditions.

For example, if the prediction data 190 indicates a malfunction of the inverter 110 itself, the inverter 110 can turn itself off, or output a control signal (e.g., to a switch) to electrically disconnect the inverter 110 from the power grid 100.

In another example, if the prediction data 190 indicates a potential overcurrent condition due to too much reactive load, the inverter 110 can change its operations to adjust a phase angle of the current in the power grid 100 proximate to the inverter 110. For example, the inverter 110 can change its operating configuration such that the phase angle between current and voltage at the inverter's output terminals counters the phase angle of the power grid 100.

In another example, if the prediction data 190 indicates a failure of an asset component of the power grid, the processor 160 can generate and transmit a message to a control unit of the power grid 100 to inform the control unit of the failure of the asset component. The control unit can adopt strategies to mitigate the component failure. For example, the control unit can determine whether the failure can be bypassed using an alternative route of the power grid 100. If it is determined that the failure can be bypassed using the alternative route, the control unit can output control signals to electronically control one or more switches to switch the power grid 100 to use the alternative route. In some examples, the control unit can be part of or communicate with the power grid characterization system 230 discussed below with reference to FIG. 2.

Inverter 110 can perform a variety of functions in the power grid 100 other than characterizing the power grid. For example, the inverter 110 can be used in a solar power system to convert the DC power generated by solar panels into AC power that can be used by household appliances and other components of the power grid 100. In another example, the inverter 110 can be used in a wind turbine to convert the variable frequency AC power generated by the turbine into a constant frequency AC power that can be used by the power grid 100. In another example, the inverter 110 can be used in an uninterruptible power supply (UPS) to convert DC battery power to AC power. In another example, the inverter 110 can be used in an electric vehicle to convert the DC power stored in batteries into AC power. In another example, the inverter 110 can be used in an air conditioning system to control the speed of the compressor motor. As described in this disclosure, the inverter 110 is equipped with additional functionalities for characterizing the power grid 100. In some implementations, the inverter 110 can perform a primary function, e.g., the DC-AC power conversion and the characterization of the power grid 100 in parallel.

The inverter 110 can be any appropriate type of inverter that suits the intended application as well as the functions described below. In some implementations, the inverter 110 can include electronics that use silicon carbide (SiC) and/or gallium nitride (GaN) as semiconductor materials, which provide advantages such as fast switching speed and low switching losses. These characteristics enable the inverter 110 to have a high switching frequency and generate high-quality output waveforms with a broad range of frequencies.

As described above, the inverter 110 uses the processor 160 to process the measurement data locally at the inverter 110. Alternatively, or in addition, the inverter 110 can be implemented to transmit the measurement data to an external computing system, e.g., a central server, so that the external system processes the data. Data transmission can be performed wired or wirelessly, e.g., over a network such as the Internet. In fact, the external computing system can process the measurement data from multiple inverters installed at multiple locations of the power grid to predict the fault conditions of the grid.

Figure 2:
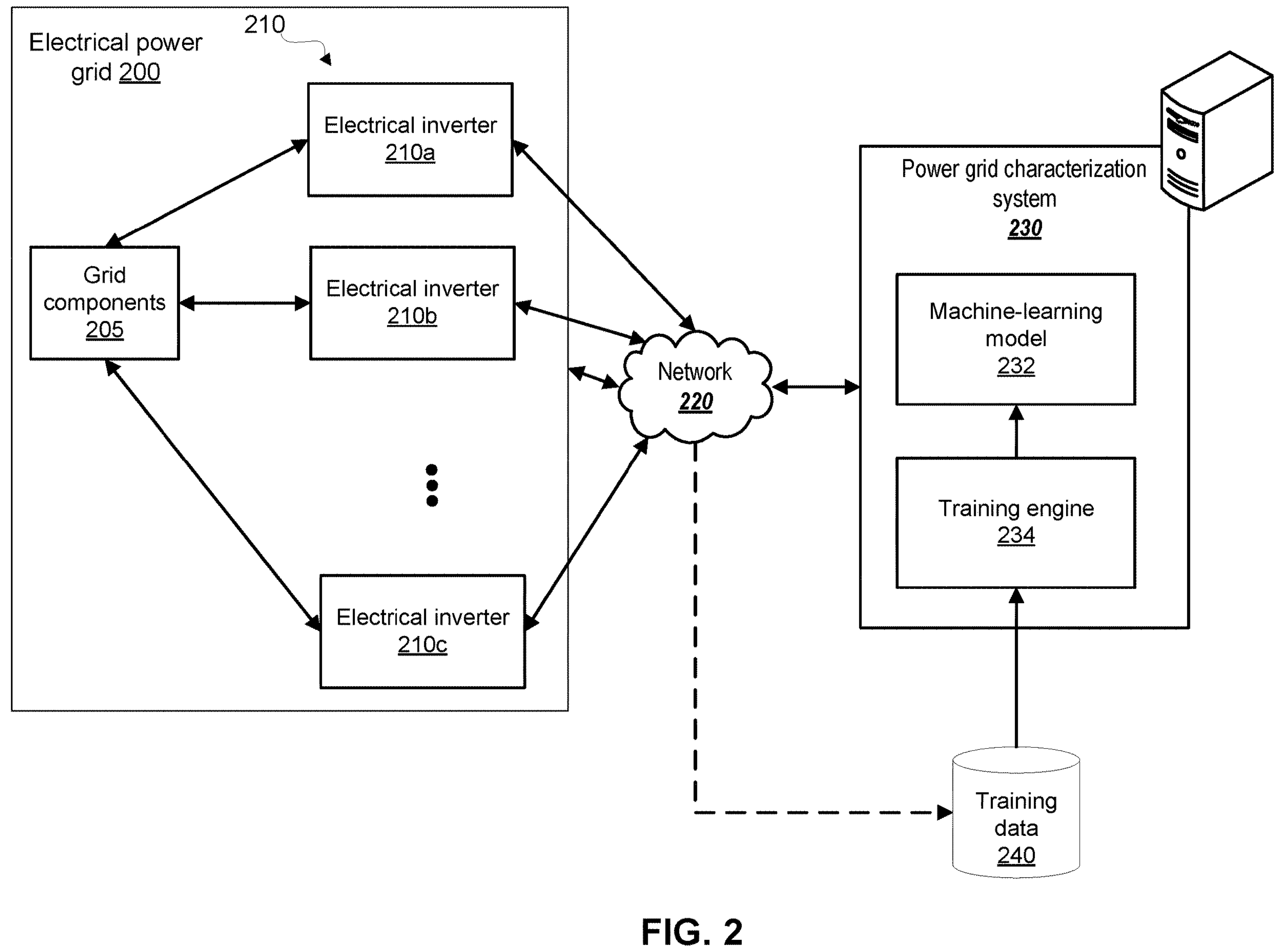
FIG. 2 shows an example of a power grid characterization system.

FIG. 2 shows a power grid characterization system 230 for characterizing an electrical power grid 200. The system 230 is an example of a system implemented as computer programs on one or more computers in one or more locations, in which the systems, components, and techniques described below can be implemented.

The power grid 200 includes grid components 205 for generating, distributing, and/or transmitting electricity to a plurality of load locations. The power grid 200 includes multiple electrical inverters 210 (e.g., 210*a*. 210*b*, 210*c*, etc.) that are electrically coupled to the power grid 200 at multiple locations. The inverters 210 can perform different functions in the power grid, such as DC-AC power conversion for solar panels, UPS batteries, or electric vehicles, AC-AC power conversion for wind turbines, or speed control of an electrical motor.

Each inverter is further configured to collect measurement data at the respective location in the power grid 200. For example, each inverter can output low-magnitude signals (e.g., by performing a frequency sweep) to the power grid 200 that do not interrupt normal operations of the power grid 100, and collects measurement data (e.g., voltage measurements and/or current measurements) characterizing the power grid's response to the low-magnitude signals at the respective location of the inverter. Additional details and examples of the signal generation and data collection by each particular inverter have been described above with reference to FIG. 1. The inverters transmit the collected measurement data to system 230 through network 220.

The system 230 receives, over network 220, the measurement data from each of the inverters 210. The system 230 includes a machine-learning model 232 configured to process the measurement data to generate prediction data that characterizes fault conditions of the power grid 200. In particular, the system 230 inputs the measurement data, and uses the machine-learning model 232 to process the input to generate an output that includes prediction data characterizing the fault conditions of the power grid 200.

In some implementations, in addition to the measurement data received from the inverters 210, the input to the machine-learning model 232 can further include data characterizing a grid topology of the electrical power grid. The grid topology data can have any appropriate data format, and in general includes data characterizing the physical layout and/or connectivity of the components that make up the power grid 200.

In some implementations, the input to the machine-learning model 232 can further include data characterizing other information that is potentially relevant to the conditions of the power grid 200 and can lead to a fault condition on the grid. Examples of such information can be weather conditions (e.g., past, current, and/or forecast whether conditions), a time stamp of the measurement data, maintenance record of the power grid 200, or occurrences of events such as fire, flood, or earthquakes in an area of the power grid, and so on.

The machine-learning model 232 can be any appropriate type of machine-learning model and can include, for example, a linear regression model, a Bayes classifier, a support vector machine, a K-means clustering model, and/or a neural network.

The prediction data in the output of the machine-learning model 232 can include values characterizing occurrences of the fault conditions. For example, the values can be in form of scores characterizing a likelihood of a particular fault condition (e.g., of a set of predefined fault conditions) currently occurring or a likelihood of particular the fault condition occurring within a predefined period of time in the future.

The grid conditions causing the corresponding fault conditions can include a malfunction of one or more of the inverters 210, a failure of an asset component (e.g., a transformer, a circuit breaker, a capacitor, a transmission line, or a distribution line) of the power grid 200, or an abnormality at a load location of the power grid 200. The prediction data can include data (e.g., a component index, a location coordinate, etc.) identifying the component at which the failure occurs. The prediction data can further specify the types of the fault conditions, such as a short circuit fault, an open circuit fault, a ground fault, an overload fault, a phase-to-phase fault, or a phase-to-ground fault.

The system 230 or another system in communication with system 230 can include a training engine 234 to perform training of the machine-learning model 232. The training engine determines parameters of the machine learning model 232 based on training data.

In general, the training data can include a set of training examples. Each training example includes a respective training input characterizing voltage and/or current measurements, and a training label indicating whether or not the training input leads to a fault condition, and if it does, characterizing at least one fault condition for the training input.

The set of training examples can include training examples generated from measurement data and/or simulation data. For example, a training example generated from measurement data can include historical data of the power grid 200 or another power grid, where the voltage and/or measurements recorded by one or more inverters in the power grid can be used as the training input, and one or more fault conditions (or normal conditions) observed for the power grid can be used as the corresponding training label.

In some implementations, the training engine 234 can repeatedly update the training of the machine-learning model 232 based on new data collected for the power grid 200 including new measurement data received from the inverters 210 and new observed fault conditions. That is, the training engine 234 can dynamically train the machine-learning model 232 based on more recently available data. The updated training can be performed periodically at a predefined interval, or based on other criteria. For example, the training engine 234 can repeatedly evaluate a prediction error of the machine-learning model 232 by comparing the predicted fault conditions and observed fault conditions, and update the training of the machine-learning model 232 when the prediction error exceeds a threshold value.

Based on the prediction data, the system 230 or another system can determine an action, such as transmitting a report or an alert message including information on the fault condition to a device that can be accessed by an operator, so that timely measures can take place to prevent the fault condition from happening or to mitigate the effect of the fault condition.

In some implementations, if the prediction data indicate one or more fault conditions are likely to happen, the system 230 or another system in communication with system 230 can identify an adjustment to be performed in at least one grid component in the power grid 200 to reduce the chance of occurrence of at least one fault condition in the one or more fault conditions, or to mitigate the negative effect of the at least one fault condition. The adjustment can include replacing a piece of faulty equipment in the grid, disconnecting a particular component, e.g., a particular inverter, from the grid, or tuning set points of a controller in the grid. The system can then send, to the electrical power grid, instructions to adjust the operational settings of the electric power grid based on the identified adjustment.

Figure 3:
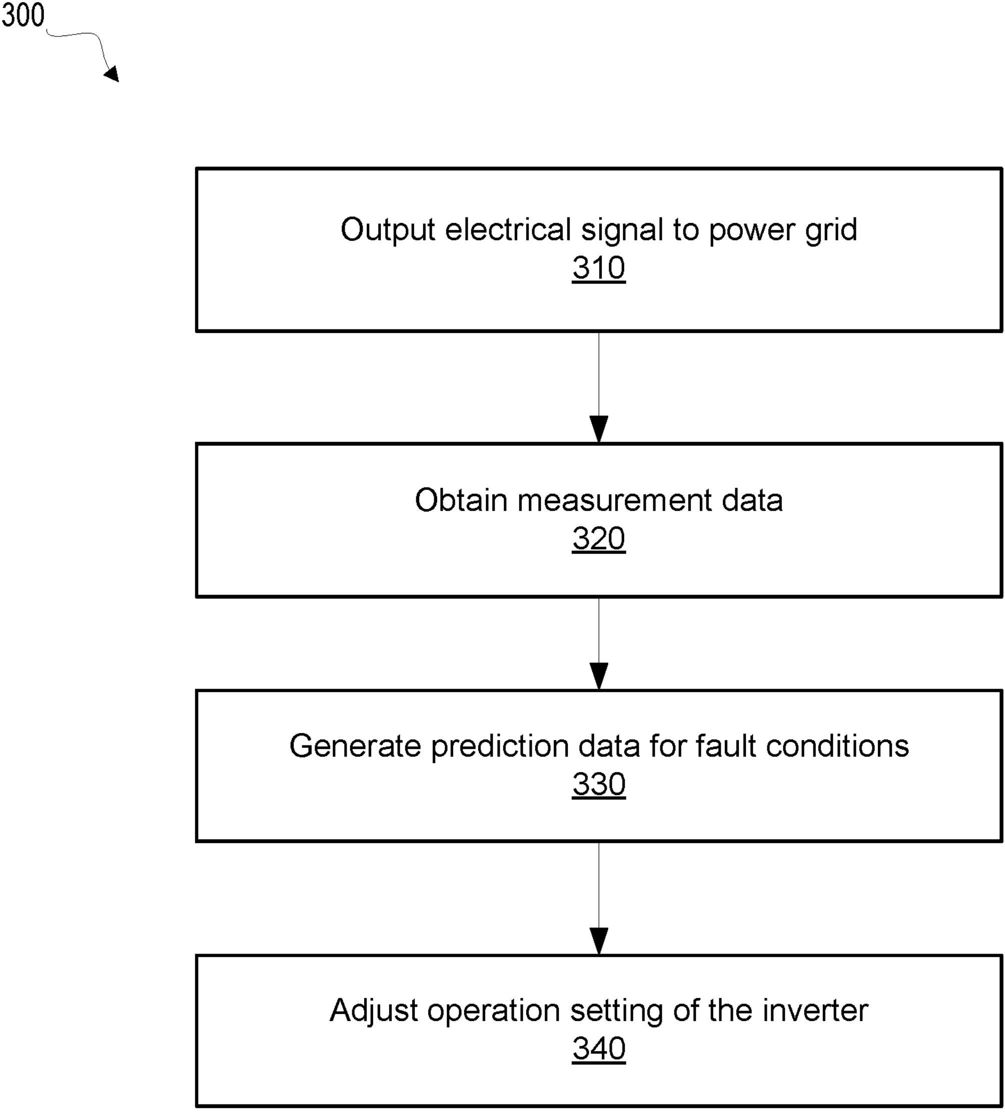
FIG. 3 is a flow diagram illustrating an example process performed by an electrical inverter for characterizing an electrical power grid.

FIG. 3 is a flow diagram illustrating an example process 300 for characterizing an electrical power grid. For convenience, the process 300 will be described as being performed by an electrical inverter. For example, the inverter 110 described with reference to FIG. 1, appropriately programmed in accordance with this specification, can perform the process 300.

At 310, the inverter outputs an electrical signal to the electrical power grid. At 320, the inverter measures a response of the power grid to the electrical signal to obtain measurement data. The response includes a voltage measurement and/or a current measurement. The inverter can repeat 310 and 320 to output a plurality of electrical signals at different frequencies to the electrical power grid, and measure the power grid's response for each outputted signal. For example, the inverter can perform a frequency sweep by sequentially generate, for each respective frequency of the different frequencies, a respective voltage waveform having the respective frequency, and measure the response (for example, the current responding to the voltage waveform) at each frequency.

At 330, the inverter processes the measurement data to generate prediction data that characterizes one or more fault conditions of the electrical power grid. For example, the inverter can (i) use the measurement data to generate an impedance spectrum of the power grid at the different frequencies, and (ii) process the impedance spectrum by using a prediction model to generate the prediction data.

In some implementations, the prediction data can include, for each respective fault condition in a set of predefined fault conditions, one or more respective output values characterizing occurrence of the respective fault condition. The characterizing of a fault condition can be about the fault condition occurring currently and/or occurring within a predefined period of time in the future.

The prediction data can include one or more grid conditions associated with respective one or more characterized fault conditions. For example, the grid condition can include a malfunction of the inverter, a failure of a component of the electrical power grid, an abnormality at a load location, or other conditions that impact the operations of the power grid.

At 340, the inverter adjusts an operational setting of the inverter based on the prediction data. The operational setting affects the response of the electrical power grid to at least one grid condition associated with at least one fault condition in the characterized fault conditions.

For example, when the prediction data includes a malfunction of the electrical inverter, a processor of the inverter can adjust the operational setting of the inverter to cause the electrical inverter to electrically disconnect from the electrical power grid. In another example, when the prediction data indicates a potential overcurrent condition, the processor of the inverter can adjust the operational setting of the inverter to cause an adjustment to a phase angle of a current in the power grid proximate to the inverter.

Figure 4:
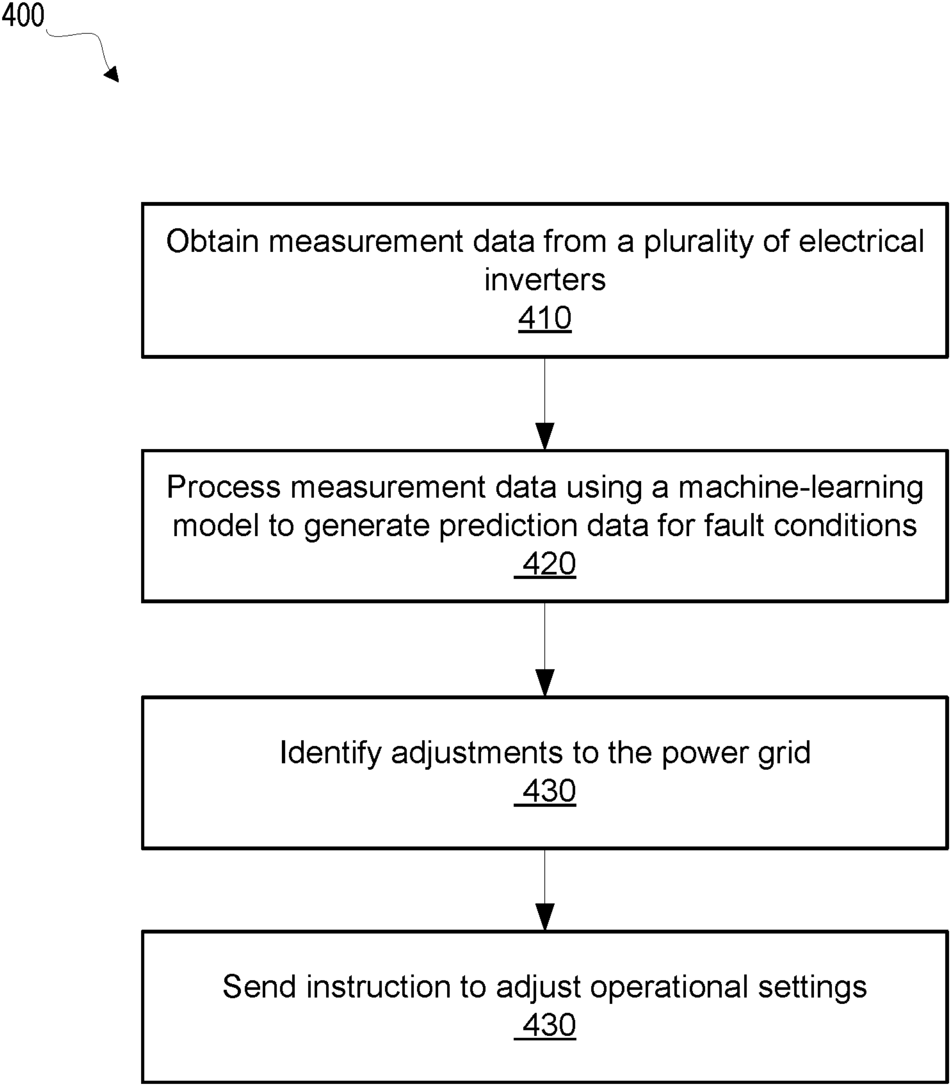
FIG. 4 is a flow diagram illustrating an example process performed by a computing system for characterizing an electrical power grid.

FIG. 4 is a flow diagram illustrating an example process 400 for characterizing an electrical power grid. For convenience, the process 400 will be described as being performed by a system of one or more computers located in one or more locations. For example, the system 230 described with reference to FIG. 2, appropriately programmed in accordance with this specification, can perform the process 400.

At 410, the system receives, over a network, respective measurement data from each inverter in a plurality of electrical inverters that are electrically coupled to an electrical power grid at a plurality of respective locations. The respective measurement data received from each inverter can include respective voltage measurements and/or respective current measurements that the inverter measured over a plurality of frequencies.

At 420, the system processes the measurement data to generate prediction data that characterizes one or more fault conditions of the electrical power grid. In particular, the system processes an input generated from the measurement data using a machine-learning model to generate the prediction data. The input can further include other data relevant to performance of the grid, such as grid topology data, weather condition data, time stamp data, grid maintenance data, or data characterizing events that can impact the operations of the power grid.

The parameters of the machine-learning model can be determined using a training process based on training data including a set of training examples. Each training example includes a respective training input characterizing respective voltage and/or current measurements and a respective training output characterizing at least one respective fault condition.

At 430, the system identifies, based on the prediction data, an adjustment to be performed in at least one grid component in the electrical power grid to reduce the chance of occurrence of at least one fault condition in the characterized fault conditions or to mitigate the negative effect of the at least one fault condition. The adjustment can include, for example, replacing a piece of faulty equipment in the power grid, disconnecting a particular inverter from the power grid, or tuning set points of a controller in the power grid. At 440, the system sends, to the electrical power grid, instructions to adjust the operational settings of the electric power grid based on the identified adjustment.

Figure 5:
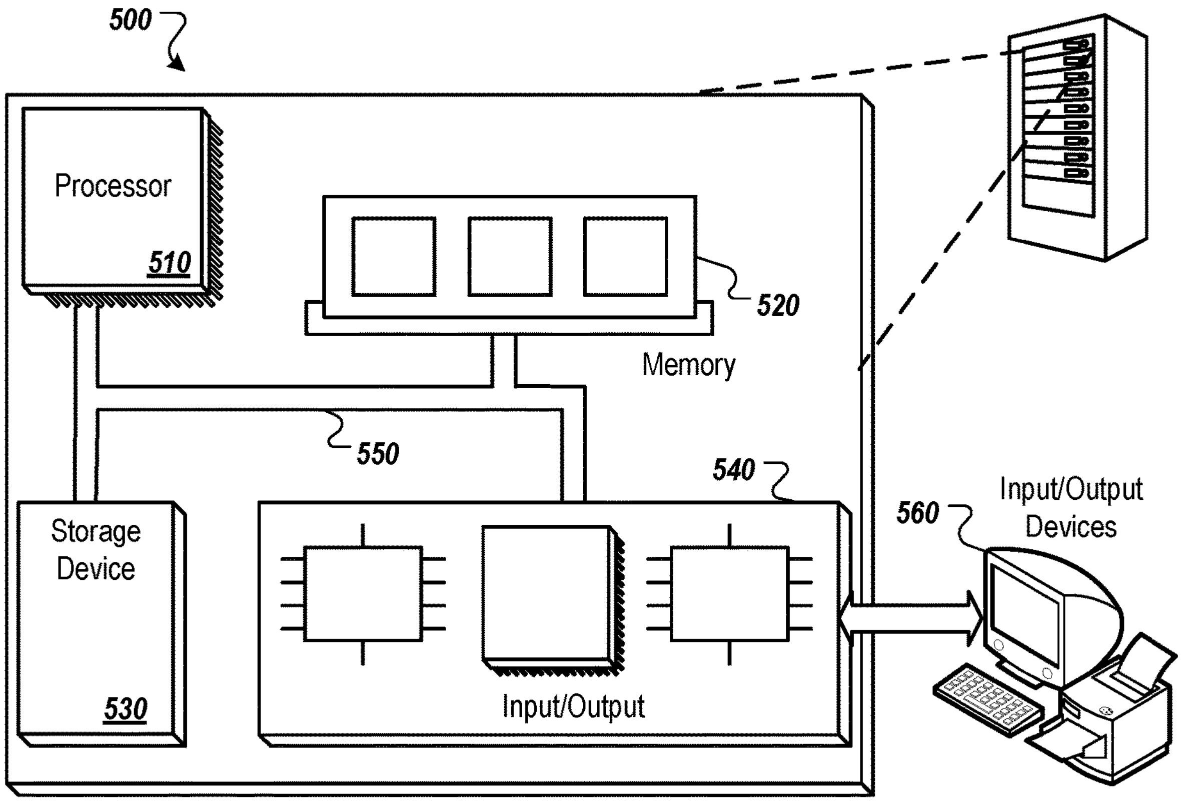
FIG. 5 shows an example computer system.

FIG. 5 shows an example computer system 500 that can be used to perform certain operations described above, for example, to perform operations of inverter 110 in FIG. 1, or operations of the system 230 of FIG. 2. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, a storage device that is shared over a network by multiple computing devices (for example, a cloud storage device), or some other large-capacity storage device.

The input/output device 540 provides input/output operations for the system 500. In one implementation, the input/output device 540 can include one or more network interface devices, for example, an Ethernet card, a serial communication device, for example, a RS-232 port, and/or a wireless interface device. In another implementation, the input/output device can include driver devices configured to receive input data and send output data to other input/output devices, for example, keyboard, printer and display devices 560. Other implementations, however, can also be used, such as mobile computing devices, mobile communication devices, set-top box television client devices, etc.

Although an example system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by a data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, that is, one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, for example, a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, for example, an FPGA (field programmable gate array) or an ASIC (application-specific integrated circuit). The apparatus can optionally include, in addition to hardware, code that creates an execution environment for computer programs, for example, code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, for example, an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a Global Positioning System (GPS) receiver, or a portable storage device, for example, a universal serial bus (USB) flash drive, to name just a few.

Computer-readable media suitable for storing computer program instructions and data include all forms of non-volatile memory, media and memory devices, including by way of example semiconductor memory devices, for example, EPROM, EEPROM, and flash memory devices; magnetic disks, for example, internal hard disks or removable disks; magneto-optical disks; and CD-ROM and DVD-ROM disks.

To provide for interaction with a user, embodiments of the subject matter described in this specification can be implemented on a computer having a display device, for example, a CRT (cathode ray tube) or LCD (liquid crystal display) monitor, for displaying information to the user and a keyboard and a pointing device, for example, a mouse or a trackball, by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of messages to a personal device, for example, a smartphone that is running a messaging application and receiving responsive messages from the user in return.

Data processing apparatus for implementing machine learning models can also include, for example, special-purpose hardware accelerator units for processing common and compute-intensive parts of machine learning training or production, that is, inference, workloads.

Machine learning models can be implemented and deployed using a machine learning framework, for example, a TensorFlow framework, a Microsoft Cognitive Toolkit framework, an Apache Singa framework, or an Apache MXNet framework.

Embodiments of the subject matter described in this specification can be implemented in a computing system that includes a back-end component, for example, as a data server, or that includes a middleware component, for example, an application server, or that includes a front-end component, for example, a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, for example, a communication network. Examples of communication networks include a local area network (LAN) and a wide area network (WAN), for example, the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, for example, an HTML page, to a user device, for example, for purposes of displaying data to and receiving user input from a user interacting with the device, which acts as a client. Data generated at the user device, for example, a result of the user interaction, can be received at the server from the device.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A power grid characterization method performed by a computing system, the method comprising:

receiving, over a network, respective measurement data from each inverter of a plurality of inverters that are electrically coupled to an electrical power grid at a plurality of respective locations, wherein the respective measurement data received from each inverter comprises one or more of respective voltage measurements or respective current measurements that the inverter measured over a plurality of frequencies;

processing an input generated from the measurement data using a machine-learning model to generate prediction data that characterizes one or more fault conditions of the electrical power grid;

identifying, based on the prediction data, an adjustment to be performed in at least one grid component in the electrical power grid to reduce a chance of occurrence of at least one fault condition in the characterized fault conditions; and sending, to the electrical power grid, instructions to adjust operational settings of the electric power grid based on the identified adjustment.

2. The power grid characterization method according to claim 1, wherein the adjustment includes at least one of replacing a piece of faulty equipment in the grid, disconnecting a particular inverter from the grid, or tuning set points of a controller in the grid.

3. The power grid characterization method according to claim 1, wherein the plurality of training examples include one or more training examples generated from simulation data.

4. The power grid characterization method according to claim 1, wherein the plurality of training examples include one or more training examples generated from measurement data.

5. The power grid characterization method according to claim 1, wherein the input further comprises data characterizing a grid topology of the electrical power grid.

6. The power grid characterization method according to claim 1, wherein the input further comprises data characterizing one or more of:

a current weather condition;

a future weather condition;

a time stamp;

a maintenance record of the power grid; or an occurrence of a fire in an area of the electrical power grid.

7. The power grid characterization method according to claim 1, wherein the prediction data comprises, for each respective fault condition in the characterized fault conditions, one or more respective output values characterizing occurrence of the respective fault condition.

8. The power grid characterization method according to claim 7, wherein one of the one or more respective output values characterizes a likelihood of the respective fault condition currently occurring or a likelihood of the respective fault condition occurring within a predefined period of time.

9. The power grid characterization method according to claim 8, wherein the prediction data identifies the one or more fault conditions from a set of predefined fault conditions, each predefined fault condition is stored on the inverter as being associated with a respective predefined grid condition, a grid condition including one or more of:

a malfunction of the inverter;

a failure of a component of the electrical power grid; or an abnormality at a load location.

10. The power grid characterization method according to claim 9, wherein the failure of the component of the electrical power grid comprises:

a transformer failure;

a circuit breaker failure;

a failure of a capacitor;

a fault in a transmission line; or a fault in a distribution line.

11. The power grid characterization method according to claim 7, wherein the one or more respective output values comprise a value identifying or locating a component of failure.

12. The power grid characterization method according to claim 1, wherein the instructions to adjust operational settings of the electric power grid comprises one or more of:

an instruction to disconnect an inverter from the electrical power grid in response to determining a malfunction of the inverter;

an instruction to disconnect a portion of the electrical power grid that is affected by the fault condition from other portions of the electrical power grid;

an instruction to bypass a portion of the electrical power grid using an alternative route; or an instruction to re-boot one or more control nodes of the electrical power grid.

13. The power grid characterization method according to claim 1, wherein the machine-learning model that has been trained based on training data comprising a plurality of training examples, each training example of the plurality of training examples comprising a respective training input characterizing respective voltage and/or current measurements and a respective training output characterizing at least one respective fault condition in the one or more fault conditions.

14. A system comprising one or more computers and one or more storage devices storing instructions that when executed by the one or more computers cause the one or more computers to perform operations comprising:

receiving, over a network, respective measurement data from each inverter of a plurality of inverters that are electrically coupled to an electrical power grid at a plurality of respective locations, wherein the respective measurement data received from each inverter comprises one or more of respective voltage measurements or respective current measurements that the inverter measured over a plurality of frequencies;

processing an input generated from the measurement data using a machine-learning model to generate prediction data that characterizes one or more fault conditions of the electrical power grid;

identifying, based on the prediction data, an adjustment to be performed in at least one grid component in the electrical power grid to reduce a chance of occurrence of at least one fault condition in the characterized fault conditions; and sending, to the electrical power grid, instructions to adjust operational settings of the electric power grid based on the identified adjustment.

15. One or more non-transitory computer storage media storing instructions that when executed by one or more computers cause the one or more computers to perform operations comprising:

receiving, over a network, respective measurement data from each inverter of a plurality of inverters that are electrically coupled to an electrical power grid at a plurality of respective locations, wherein the respective measurement data received from each inverter comprises one or more of respective voltage measurements or respective current measurements that the inverter measured over a plurality of frequencies;

processing an input generated from the measurement data using a machine-learning model to generate prediction data that characterizes one or more fault conditions of the electrical power grid;

identifying, based on the prediction data, an adjustment to be performed in at least one grid component in the electrical power grid to reduce a chance of occurrence of at least one fault condition in the characterized fault conditions; and sending, to the electrical power grid, instructions to adjust operational settings of the electric power grid based on the identified adjustment.

* * * * *